2 Sheets—Sheet 1.

T. F. TANNER.
Corn-Planter.

No. 216,471.   Patented June 10, 1879.

WITNESSES:
Henry N. Miller
C. Sedgwick

INVENTOR:
T. F. Tanner
BY Munn & Co
ATTORNEYS.

2 Sheets—Sheet 2.

T. F. TANNER.
Corn-Planter.

No. 216,471.  Patented June 10, 1879.

WITNESSES:
Henry N. Miller
C. Sedgwick

INVENTOR:
T. F. Tanner
BY Munn
ATTORNEYS.

UNITED STATES PATENT OFFICE

THEODORE F. TANNER, OF JEFFERSON CITY, MISSOURI.

IMPROVEMENT IN CORN-PLANTERS.

Specification forming part of Letters Patent No. 216,471, dated June 10, 1879; application filed September 24, 1878.

*To all whom it may concern:*

Be it known that I, THEODORE F. TANNER, of Jefferson City, in the county of Cole and State of Missouri, have invented a new and Improved Corn-Planter, of which the following is a specification.

My invention relates to a machine for planting corn in hills at a uniform distance apart.

I use a suitable frame mounted on wheels carrying seed-boxes that are provided with valves and slides, which are opened at regular intervals by connections from the wheels of the apparatus.

The invention will first be described in connection with the drawings, and then pointed out in the claim.

Figure 1:
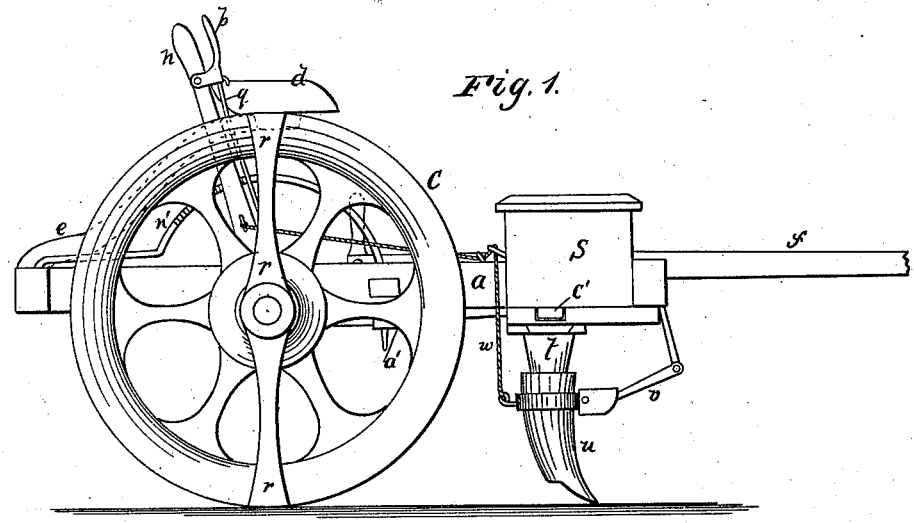
Figure 2:
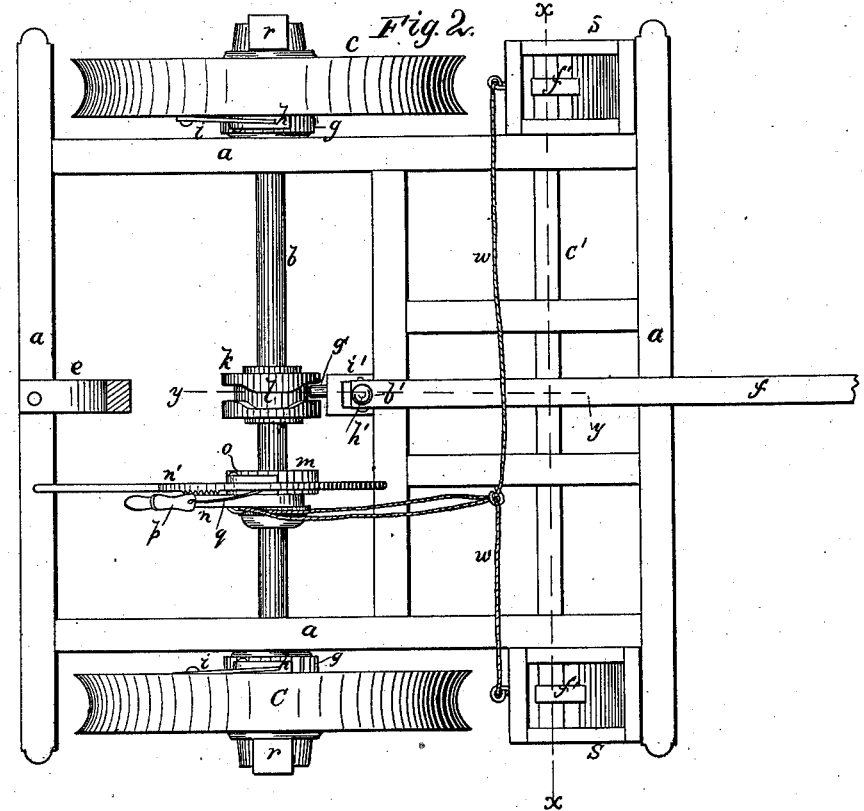
Figure 3:
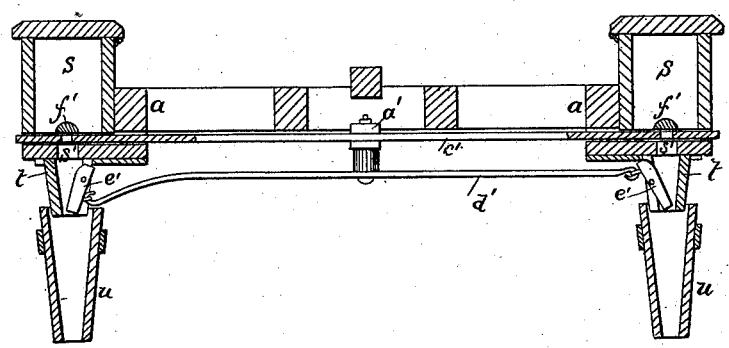
Figure 4:
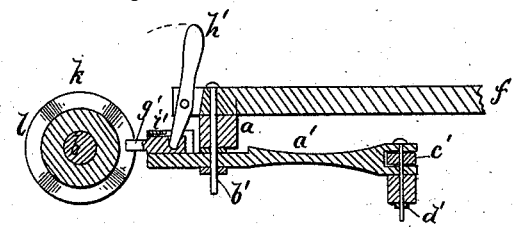

In the accompanying drawings, Figure 1 is a side elevation of my improved machine. Fig. 2 is a plan of the same. Fig. 3 is a cross-section through the seed-boxes on the line $x\,x$ of Fig. 2. Fig. 4 is a sectional elevation of the devices for operating the valves and slides.

Similar letters of reference indicate corresponding parts.

The frame $a\,a$ is upon an axle, $b$, that has wheels $c\,c$, on which the machine runs. The wheels $c$ are loose upon the axle $b$. $d$ is the seat upon the bar $e$, that is secured to the rear part of frame $a$. $f$ is the pole.

Upon the axle $b$ contiguous to the inner side of each wheel $c$ is a ratchet-wheel, $g$, keyed to the axle $b$. $h$ is a spring-pawl hung on each wheel $c$, so as to bear upon the ratchet-wheel $g$, and the pawl and ratchet are so arranged that when the machine is drawn forward the pawl engaging with the teeth of the ratchet will turn the axle $b$. The spring $i$ of the pawl $h$ is arranged so that it can be released and permit the pawl to be turned back, and the wheels $c\,c$ will then turn loosely on the axle.

$k$ is a roller keyed to axle $b$ at about the center of the machine, and having a cam-groove, $l$, cut in its surface. $m$ is a ratchet-wheel keyed to axle $b$ to the right of seat $d$. $n$ is a hand-lever hung loosely on axle $b$ and carrying a spring-pawl, $o$, that engages with the teeth of ratchet-wheel $m$. The outer end of the lever $n$ stands adjacent to the seat $d$, so that the driver may move it back and forth, and by the ratchet and pawl $n\,o$ turn the axle $b$ forward. $p$ is a thumb-lever at the outer end of lever $n$, connected by a wire or rod, $q$, with pawl $o$, by which lever $p$ the pawl $o$ may be disengaged from the ratchet-wheel $m$. The lever $n$ may be engaged with the teeth on a segment, $n'$, to hold the said lever at any place.

Upon the axle $b$, and fixed thereon outside of each wheel $c$, is the checker $r$, that consists of two arms extending from a hub in opposite directions. The outer end of each arm is on line with the periphery of the wheel, and the position of this checker $r$ indicates to the driver when the parts of the machine are in proper position for commencing work, as hereinafter described.

$s\,s$ are the seed-boxes, attached at the forward part of frame $a$, one in front of each wheel $c$. $t$ is a short spout at the under side of each box $s$, and $u$ is the delivery-spout that carries the seed to the ground into the furrow made by the lower end of spout $u$. Each delivery-spout $u$ is hung on a loose arm, $v$, attached to frame $a$, and is held up to place by a cord, $w$, that passes to lever $n$ on axle $b$ before mentioned, where the cords $w$ are attached.

$a'$ is a horizontal lever, fulcrumed at $b'$ on the under side of frame $a$ at the center of the machine. Fig. 4 shows this lever $a'$ more clearly. Its forward end connects with the sliding bar $c'$ and rod $d'$, that extend across the front of the machine. The bar $c'$ enters at its outer ends, the seed-boxes $s\,s$ forming a slide to cut off the grain from the opening $s'$ in each seed-box, and the rod $d'$ is connected at its outer ends with the valves $e'$ in the spouts $t$. I have shown the slide $c'$ as having a hole that collects the grain when the slide is in one position and passes under a cross-bar, $f'$, in the seed-box over the opening $s'$ when the slide is moved in the other direction.

The rod $d'$ may be in two parts, connected by a screw-coupling, so that the valves $e'$ may be adjusted. It is to be understood that the valves $e'$ will be arranged to close the lower end of spouts $t$ when the slides $c'$ are in position for allowing the grain to drop, and the reverse.

To impart an oscillating motion to the lever $a'$, and thereby move the slide $c'$ and rod $d'$, a pin, $g'$, at the inner end of lever $a'$ enters the cam-groove $l$ of roller $k$. The pin $g'$ is upon the lower end of a lever, $h'$, and is fitted to slide in a box, $i'$, on lever $a'$, so that it may be moved in and out of the cam-groove $l$ by the lever $h'$. The groove $l$ is shaped so as to move the lever $a'$, and operate the slides $c'$ and $d'$ in both directions twice during a revolution of roller $k$, and thereby drop the seed in hills a distance apart equal to one-half the circumference of wheels $c$, and drop it from both boxes at the same time.

In going to and from the field the pawls $h$ are to be disconnected, and the wheels then turn freely on shaft $b$. To set the machine in operation the pawls $h$ will be replaced and the lever $n$ operated to turn the cam-roller $k$ until the pin $g'$ is in the groove $l$ in such position that the first movement of the slide $c'$ will drop the corn upon the valves $e'$. The checker $r$ is fixed upon the axle $b$ in such relative position to the cam-roller $k$ that when the arms of the checker $r$ stand vertically the roller $k$ and pin $g'$ are in proper position to commence work. This checker $r$ thus becomes a guide for the driver to enable him to plant the hills in line and to start the planting correctly in first commencing work or after turning a row. When the end of a row is reached the driver will move the lever $h'$ to withdraw the pin $g'$, and thus suspend the dropping mechanism. Before commencing a new row the lever $n$ should be operated to bring roller $k$ and checker $r$ in position, and then the pin $g'$ moved into the groove $l$.

I do not limit myself to the exact details of construction set forth, as they may be varied without departing from the essential features of my invention.

Having described my invention, I claim as new and desire to secure by Letters Patent—

A corn-planter provided with two droppers, having lever-valves $e'$ $e'$, connected by a movable rod, $d'$, attached at the upper end of one lever and at the lower end of the other, to drop two hills of parallel rows simultaneously, as described.

THEODORE F. TANNER.

Witnesses:
  JACOB TANNER,
  CONRAD WAGNER.